United States Patent
Chen et al.

(10) Patent No.: US 6,829,616 B2
(45) Date of Patent: Dec. 7, 2004

(54) METHOD, SYSTEM, AND PROGRAM FOR IMPLEMENTING A DATABASE TRIGGER

(75) Inventors: Yao Ching Stephen Chen, Saratoga, CA (US); Karelle Lynne Cornwell, San Jose, CA (US); Tammie Dang, Morgan Hill, CA (US); Beth Rivenes Moore, Morgan Hill, CA (US); Kalpana Shyam, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 09/817,501

(22) Filed: Mar. 26, 2001

(65) Prior Publication Data

US 2002/0138497 A1 Sep. 26, 2002

(51) Int. Cl.[7] .............................................. G06F 17/30
(52) U.S. Cl. ............................. 707/102; 707/2; 707/3; 707/4; 707/103; 707/104; 707/101
(58) Field of Search .................................. 707/102, 100, 707/103, 104, 3, 4, 2, 101

(56) References Cited

U.S. PATENT DOCUMENTS

| | | | | |
|---|---|---|---|---|
| 5,742,810 A | | 4/1998 | Ng et al. ........................ 707/4 |
| 5,857,203 A | | 1/1999 | Kauffman et al. ............. 707/4 |
| 5,873,105 A | | 2/1999 | Tremblay et al. ........... 707/200 |
| 5,890,160 A | | 3/1999 | Hembry ....................... 707/103 |
| 5,924,100 A | | 7/1999 | Chang et al. ................ 707/103 |
| 5,930,795 A | * | 7/1999 | Chen et al. .................. 707/100 |
| 5,963,936 A | | 10/1999 | Cochrane et al. .............. 707/3 |
| 6,061,689 A | | 5/2000 | Chang et al. ................ 707/103 |
| 6,122,640 A | * | 9/2000 | Pereira ........................ 707/103 |
| 6,144,970 A | | 11/2000 | Bonner et al. .............. 707/206 |
| 6,374,236 B1 | * | 4/2002 | Chen et al. ..................... 707/2 |
| 6,418,448 B1 | * | 7/2002 | Sarkar ...................... 707/104.1 |

FOREIGN PATENT DOCUMENTS

RU 2030781 3/1995

OTHER PUBLICATIONS

IBM, Corp. "Enforcing Business Rules with Constraints and Triggers" [online], date unlisted, pp. 1–7. [Retrieved on Jan. 4, 2001].Retrieved from the Internet at URL: <http://www–4.ibm.com/cgi–bin/db2www/data/db2/ubd/winos2unix/support/document.d2w/report?fn=db2v7y0db2y043.htm#HDRKEYCON>.

IBM, Corp. "Mapping a Relational Database to a Hierarchical File System", IBM Technical Disclosure Bulletin vol. 38 No. 10, Oct. 1995, pp. 309–311.

(List continued on next page.)

Primary Examiner—Thuy N. Pardo
(74) Attorney, Agent, or Firm—David W. Victor; Konrad, Raynes & Victor LLP

(57) ABSTRACT

Provided is a method, system, and program for implementing a database trigger. Upon detecting a trigger event, a determination is made of at least one row in a base table affected by the trigger event. For each column in the base table of a data type that is referenced in a triggered action associated with the trigger event, a reference is generated referencing the data of the data type. The reference is inserted in a transition table column including data of the data type from the affected row in the base table referenced in the triggered action. The reference is used to access the data of the data type when performing the triggered action.

36 Claims, 3 Drawing Sheets

OTHER PUBLICATIONS

IBM, Corp. "SQL Reference", from IBM DB2 Universal Database, Version 6, 1999, pp. 19–22, pp. 690–699 and pp. 1085–1088.

Pirahesh, H. *Object—Oriented Features of DB2 Client// Ever*. Proceedings of the 1994 ACM SIGMOD International Conference on Management of Data. SIGMOD Record, vol. 23, Issue 2, Jun. 1994, 3 pages.

Biliris, A. *An Efficient Database Storage Structure for Large Dynamic Objects*. Eighth International Conference on Data Engineering, Feb. 2–32, 1992, Issue XVI, pp. 301–308. Sponsored by IEEE Computer Society Technical Committee on Data Engineering.

Riley, M.F., et al. *The Design of Multimedia Object Support in DEC Rdb*. Digital Technical Journal., vol. 5, No. 2, Spring 1993, pp. 50–64.

O'Connnell, W., et al. *Optimizer and Parallel Engine Extensions for Handling Expensive Methods Based on Large Objects*. 15$^{th}$ International Conference on Data Engineering, Mar. 23–26, 1999, Sydney, Australia, pp. 304–313. Sponsored by IEEE Computer Society Technical Committee on Data Engineering.

* cited by examiner

METHOD, SYSTEM, AND PROGRAM FOR IMPLEMENTING A DATABASE TRIGGER

BACKGROUND OF THE INVENTION

1. Field of the Invention

The present invention relates to a method, system, and program for implementing a database trigger.

2. Description of the Related Art

Data records in a relational database management system (RDBMS) are maintained in tables, which are a collection of rows all having the same columns. Each column maintains information on a particular type of data for the data records which comprise the rows. Certain database programs, such as the International Business Machines Corporation ("IBM") DB2 database program, include a trigger feature. A trigger defines a set of actions to perform when the database program modifies data in a specified database table. Triggers are used to perform functions such as validation of input data, automatically generate a value for a newly inserted row, read from other tables for cross-referencing purposes, write to other tables for audit-trail purposes, and support alerts through electronic mail messages. Triggers permit faster application development, global enforcement of business rules, and easier maintenance of applications and data.

Triggers are optional and are defined using the CREATE TRIGGER statement. A trigger may be defined with the following criteria. A "base table" is the table for which the trigger is defined. The "trigger event" defines a specific SQL operation that modifies the base table. The "trigger event" may comprise, for example, a delete, insert or update operation with respect to one or more columns of the base table. The "trigger activation time" defines, for example, whether the trigger should be activated before or after the trigger event is performed on the base table. The "triggered action" consists of an optional search condition and a set of SQL statements that are executed whenever the trigger event occurs.

The triggered action may operate on data from columns in the set of affected rows of the base table. Data from the set of affected rows in the base table are carried over to the triggered action through the use of transition variables. Transition variables use the names of the columns in the base table qualified by a specified name that identifies whether the reference is to the old value (prior to the update) or the new value (after the update). The new data can also be modified when subject to the triggered action. For instance, upon the occurrence of the trigger event, data from the base table subject to the SQL triggering action may be written to another table. In such case, the data to copy over as part of the triggered action is stored in a transition variable. This transition variable is then provided to the SQL update statement that implements the triggered action. Transition variables maintain their data in a work file. Further details of a database trigger are described in the IBM publication, "IBM DB2 Universal Database: SQL Reference, Version 6," IBM document no. SC09-2847-00 (Copyright IBM, 1999), which publication is incorporated herein by reference in its entirety.

A large object (LOB) is a data type that contains large amounts of data, such as images, movies, audio, etc. In the prior art, a large object (LOB) that is a transition variable cannot be stored in the same work file that stores non-LOB transition variables due to the potentially large size of the large object (LOB) data.

Thus, there is a need in the art for improved techniques for maintaining large objects (LOBs) as transition variables.

SUMMARY OF THE PREFERRED EMBODIMENTS

Provided is a method, system, and program for implementing a database trigger. Upon detecting a trigger event, a determination is made of at least one row in a base table affected by the trigger event. For each column in the base table of a data type that is referenced in a triggered action associated with the trigger event, a reference is generated referencing the data of the data type. The reference is inserted in a transition table column including data of the data type from the affected row in the base table referenced in the triggered action. The reference is used to access the data of the data type when performing the triggered action.

In further implementations, the reference includes a row identifier and version number of the data in the base table column referenced by the triggered action.

Still further, the data type for which the reference is generated comprises a large object data type. In such case, the reference is used to access the large object data by accessing an auxiliary table storing large object data for the base table column referenced by the triggered action. The row identifier and the version number in the reference are used to access the large object in the auxiliary table. The row identifier and version number identify the location of the large object data in the auxiliary table.

In the described implementations, a reference to data of a particular data type, such as a large object (LOB) data type, is stored in a transition table used by the triggered action instead of the actual data itself to reduce the space in the transition table needed to represent the LOB data and to maximize the number of transition variable rows that may be maintained in the transition table.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
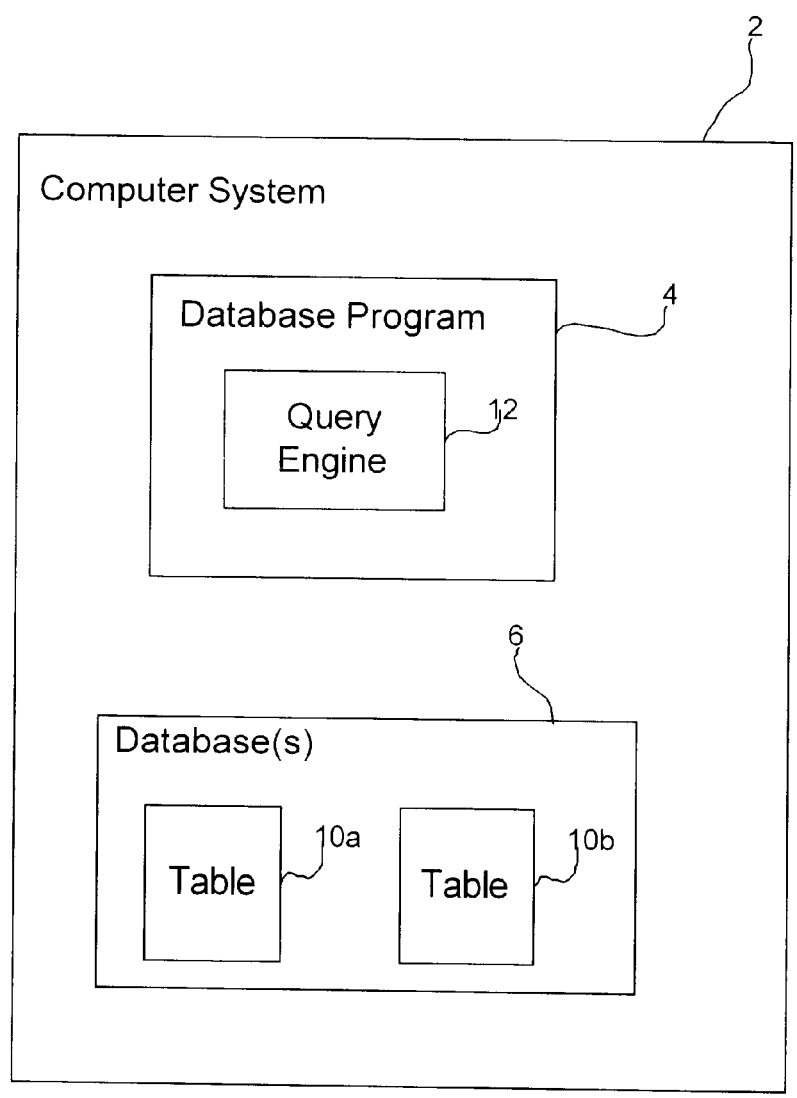
FIG. 1 is a block diagram illustrating a computing environment in which certain of the described implementations are embodied.

FIG. 1 illustrates a computing environment in which a database may be implemented. A computer system 2, which may be a computer including an operating system such as MICROSOFT WINDOWS 98 and WINDOWS NT, AIX, OS/390, OS/2, MVS, etc., includes a database program 4, such as DB2, MICROSOFT Access, Oracle Corporation's ORACLE 8, etc. The database program 4 is used to access database information maintained in one or more databases 6. The database(s) 6 may consist of one more tables 10a, b. Further details of the structure and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in their entirety. **Microsoft, Windows, and Windows NT are registered trademarks of Microsoft Corporation; DB2, AIX, OS/390, and OS/2 are registered trademarks of IBM, MVS is a trademark of IBM; and Oracle8 is a trademark of Oracle Corporation.

Figure 2:
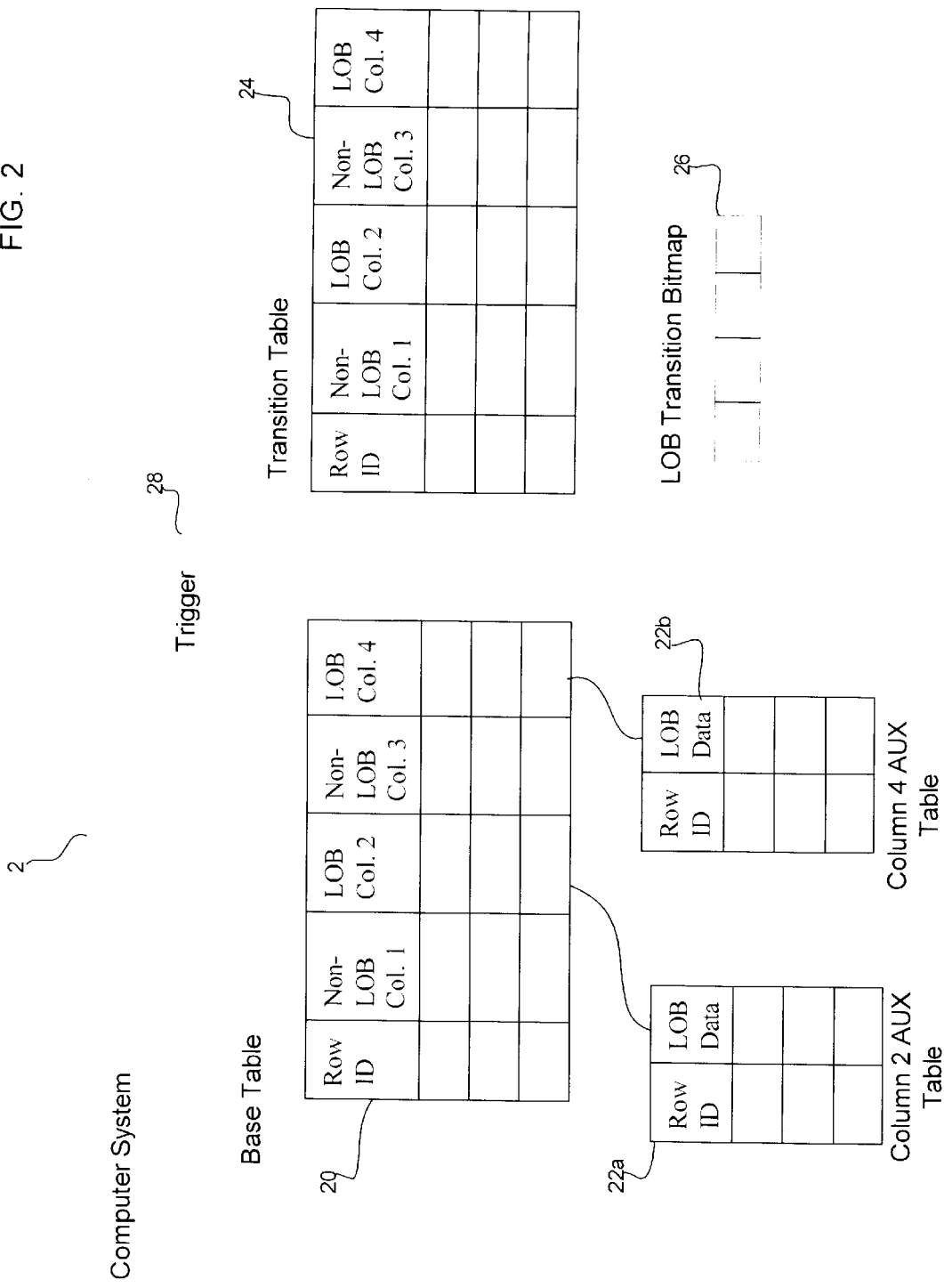
FIG. 2 illustrates an arrangement of data structures used in the described implementations to implement a trigger.

FIG. 2 illustrates an arrangement of data structures used by the database program 4 to allow large object (LOB) data to be stored with transition variables. A base table 20 comprises a database table having a row identifier ("row ID") and one or more non-large object (LOB) columns and large object (LOB) columns. In the prior art, the actual large object (LOB) data in a column is maintained in a separate auxiliary table 22a, b for the large object (LOB) column. The base table 20 maintains in the large object (LOB) column a version number. In the prior art, the database program 4 can access the actual large object (LOB) data in the auxiliary table 22a, b using the version number, column number in the base table, and row ID. FIG. 2 illustrates auxiliary tables 22a, b associated with the LOB columns in the base table in a manner known in the art.

A transition table 24 includes transition variables created in response to trigger events to be used during triggered action. The transition table 24 includes a row ID column indicating the corresponding row ID in the base table 20 from which the column data for the transition variable was accessed. The non-LOB columns in the transition table 24 include the column data for non-LOB columns from one base table row 20 affected by the trigger event. The LOB columns of the transition table 24 include a LOB reference code, or any other such reference known in the art, that can be used to access the actual LOB data in the auxiliary tables 22a, b. The LOB reference code is descriptive information identifying a LOB object. In certain implementations, the LOB reference code maintained in the transition table 24 includes the row ID and the version number of the LOB data in the base table 20 row affected by the trigger event at the trigger activation time. The SQL engine 12 uses the LOB reference code in the transition table 24 to access the LOB data when executing the triggered action that accesses the LOB data addressed by the LOB reference code.

The transition table 24 includes one column corresponding to each column in the base table 20. The column number in the transition table 24 including the LOB reference code can be used to determine the auxiliary table 22a, b maintaining the LOB data. The row ID and version number in the LOB reference code are used to access the correct LOB data in the auxiliary table 22a, b.

The version number of the LOB is specified because the triggered action can specify that the data in the columns from the base table stored as transition variables comprises the data before the triggered action (an old table) or the data after the trigger event (a new table). Further, the version number is also specified because the LOB column in the base table 20 may be later updated after the triggered action without invoking a triggered action. In such case, the LOB data in the auxiliary table 22a, b would be updated. To ensure that the older version of the LOB data referenced in the transition table 24 remains in the auxiliary table 22a, b after the LOB update for use with the triggered action, a lock may be placed on the version of the LOB data in the auxiliary table 22a, b referenced in the transition table 24. Such a lock would prevent subsequent updates of the LOB data in the auxiliary table 22a, b from performing a space release and clean-up of the older version of the LOB data used in the triggered action.

The LOB reference code in the transition table 24 may be implemented as a complex string object, which may be 120 bytes long. In certain implementations, the complex string object (CSO) contains specific information about the LOB auxiliary tables 22a, b and specific information about the corresponding row in the table 22a, b including the LOB data. In this way, the LOB data may be materialized directly from the auxiliary table 22a, b into the application buffer without ever having to be copied into the transition table 24. This arrangement conserves processor cycles because the LOB data, which comprises a large amount of data, does not have to be copied from the auxiliary table 22a, b to the transition table 24 and then from the transition table 24 to the application buffer. Further, the transition table 24 may be implemented in a work file that has expanded columns for the LOB columns to store the complex string objects maintaining the LOB reference code.

In certain implementations, to conserve space usage in the transition table 24 to maximize the number of transition variables maintained in one transition table 24, the LOB reference code is only maintained for those LOB columns used in the triggered action. The LOB columns in the transition table 24 that are not accessed by the triggered action, e.g., used to update another table, remain empty. A LOB transition bitmap 26 includes a bitmap value for each data column in the base table 20. Bitmap values in the LOB transition bitmap 26 are "turned on" for those LOB columns in the transition table 24 including LOB reference codes used by the triggered action. In this way, the database program 4 or query engine 12 can readily determine the LOB columns in the transition table 24 for which the LOB reference codes must be saved when adding transition variables, i.e., the rows from the base table 20 affected by the triggered action, to the transition table 24. The LOB transition bitmap 26 may be generated at the same time the transition table 24 is created. When creating the LOB transition bitmap 26, the bitmap values in the bitmap 26 corresponding to LOB columns used in the triggered action would be set to "on" or one.

FIG. 2 also shows a trigger 28. The trigger 28 is created using a CREATE TRIGGER SQL statement, such as the trigger statement defined in the IBM "SQL Reference", incorporated herein by reference above, where the trigger activation time, i.e., before or after, the base table, and the triggered action are specified. When determining that a trigger event has occurred, the SQL engine 12 can use the LOB reference code in the LOB column of the transition table 24 to access LOB data subject to the triggered action SQL operation.

Figure 3:
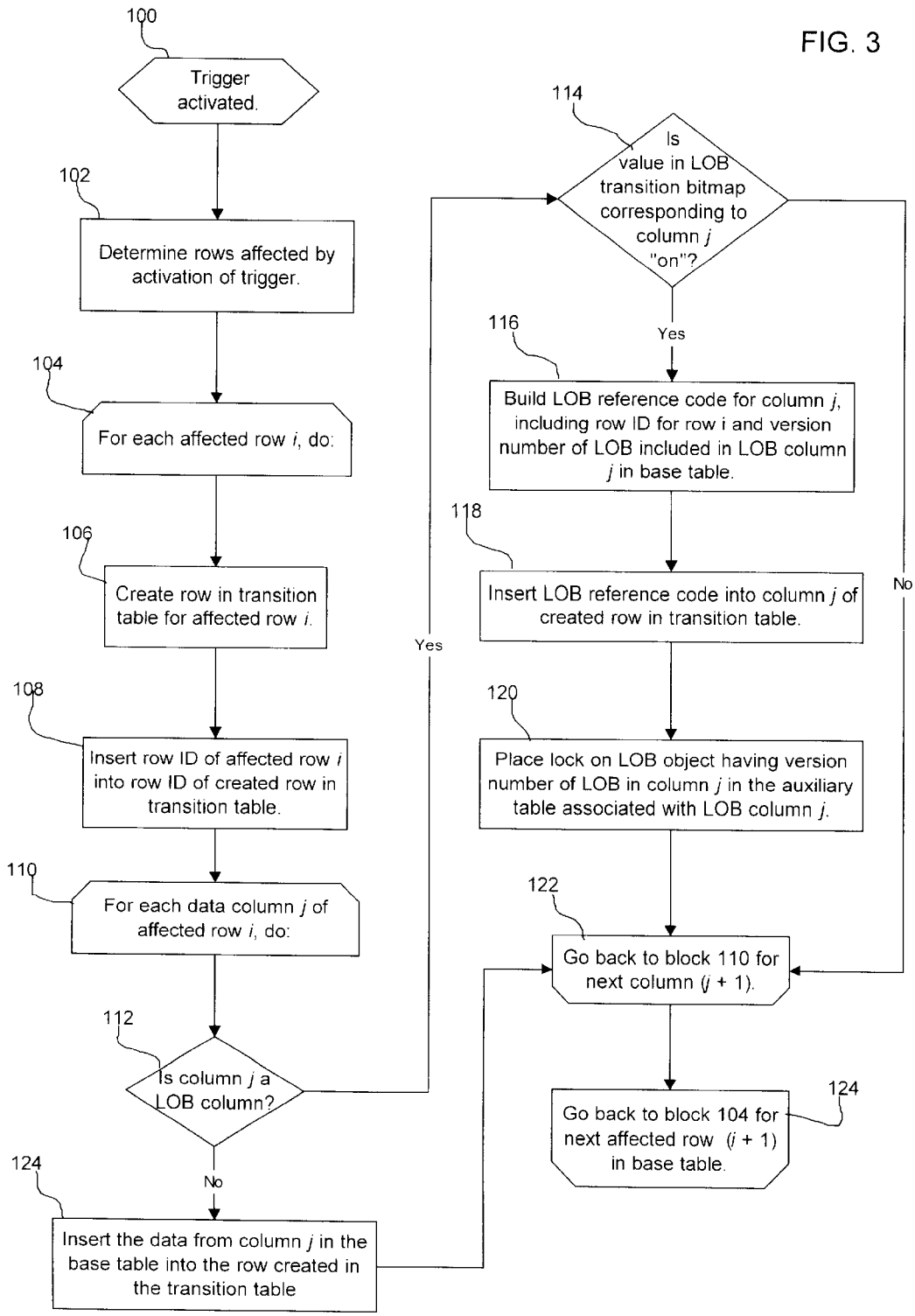
FIG. 3 illustrates logic in accordance with certain implementations to maintain a reference code to column data referenced by a triggered action in a transition table.

FIG. 3 illustrates logic implemented in the SQL engine 12 to process trigger events and to generate and maintain LOB reference codes in the transition table 24 in accordance with certain described implementations of the invention. Control begins at block 100 with the SQL engine 12 detecting a trigger activation event with respect to the base table 20. In response, the SQL engine 12 determines (at block 102) the one or more rows of the base table 20 affected by the trigger activation. The SQL engine 12 then proceeds to perform a loop at block 104 to block 122 to create rows in the transition table 24. At block 106, the SQL engine 12 creates a row in the transition table 24 for the affected row i in the base table 20 The row ID of the affected row i in the base table 20 is then inserted (at block 108) in the row ID column of the row created in the transition table 24. At blocks 110 through block 124, the SQL query engine 12 adds column data for each column from the affected row i in the base table 20 to the created corresponding row in the transition table 24. If (at block 112) column j is a LOB column, then the SQL engine 12 determines (at block 114) whether the value in the LOB transition bitmap 26 corresponding to column j is "on", thereby indicating that the LOB data in column j is used by the SQL engine 12 when executing the triggered action.

If (at block 114) the bitmap value in the LOB transition bitmap 26 is "on" for column j, then the SQL engine 12 builds (at block 116) the LOB reference code for column j, including the row ID for row i and the version number of the LOB included in the LOB column j in the base table 20 to use with the triggered action. The LOB reference code is then inserted (at block 118) into column j of the created row in the transition table 24, providing a reference to that version of the LOB data in the auxiliary table 22a, b corresponding to that LOB column. The SQL engine 12 places a lock (at block 120) on the version of the LOB data in the auxiliary table 22a, b associated with column j that is in the LOB column of the base table 20 when the trigger event occurs.

If (at block 112) column j is not a LOB column, then the SQL query engine 12 inserts (at block 124) the data for column j from the base table into column j in the created row in the transition table 24. From block 124 or 120, control proceeds (at block 122) back to block 110 to process the next column j in the base table 20 of the affected row i. After processing all columns for affected row i, control proceeds (at block 124) back to block 104 to consider the next affected row i the base table 20.

With the logic of FIG. 3, the transition table 24 maintains a LOB reference code that the SQL engine 12 can use to access the LOB data when using the transition variable referenced in the triggered action. Further, the LOB reference code references a particular version of the LOB data in the auxiliary table 22a, b that is not removed or erased from the auxiliary table 22a, b because of the lock placed on that version of the LOB data to maintain for use by the triggered action. By using the LOB reference code, the LOB data is effectively maintained in the transition table in a manner that minimizes the use of space in the transition table 24 to maximize the number of transition variables that can be maintained in the transition table 24. The LOB reference code consumes substantially less space in the transition table 24 than would the LOB data itself. Moreover, LOB reference codes are only stored in the transition table 24 for those LOB columns that are referenced by the triggered action, thereby further saving space in the transition table 24.

In certain implementations, if a trigger is defined with multiple events associated with the same triggered action, then the same LOB transition bitmap 26 can be used to determine those columns in the transition table 24 that will store the LOB reference code. Moreover, if one event triggers multiple actions, then a single LOB transition bitmap 26 can be used to indicate those LOB columns in the transition table 24 that include LOB reference codes used by the triggered action.

What follows are some alternative implementations.

The described implementations include a method, apparatus or article of manufacture using standard programming and/or engineering techniques to produce software, firmware, hardware, or any combination thereof. The term "article of manufacture" as used herein refers to code or logic implemented in one or more hardware logic devices (e.g., an integrated circuit chip, Field Programmable Gate Array (FPGA), Application Specific Integrated Circuit (ASIC), etc.) or implemented in one or more computer readable media (e.g., magnetic storage medium (e.g., one or more hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code of the described implementations may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The described implementations were described with respect to a code for LOB data to reference in the transition table. In additional embodiments, a code can be used to represent data types other than LOB data types in the transition table 24.

The algorithm of the preferred embodiments was described as having particular steps in a particular order. However, alternative algorithms in accordance with the invention may include modifications, deletions, and/or additions to the steps described in the preferred embodiment algorithms. Such modified algorithms would still produce more efficient and faster searches than current techniques.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for implementing a database trigger, comprising:

detecting a trigger event;

determining at least one row in a base table affected by the trigger event;

for each column in the base table of a data type that is referenced in a triggered action associated with the rigger event, generating a reference referencing the data of the data type;

inserting the reference in a transition table column including data of the data type from the affected row in a base table referenced in the triggered action; and using the reference to access the data of the data type when performing the triggered action.

2. The method of claim 1, wherein the reference includes a row identifier and version number of the data in the base table column referenced by the triggered action.

3. The method of claim 2, wherein using the reference to access the data comprises accessing the data having the version number indicated in the reference at the row identifier location of the data maintained for the base table.

4. The method of claim 1, further comprising:
placing a lock on the data having the version number included in the reference referenced by the triggered action.

5. The method of claim 2, wherein the data type for which the reference is generated comprises a large object data type, wherein using the reference to access the large object data comprises:
accessing an auxiliary table storing large object data for the base table column referenced by the triggered action; and
using the row identifier and the version number in the reference to access the large object in the auxiliary table, wherein the row identifier and version number identify the location of the large object data in the auxiliary table.

6. The method of claim 1, wherein the data type in the base table column for which the reference is generated comprises a first data type and wherein at least one base table column has data of a second data type, further comprising:
for each column in the base table including data of the second data type, inserting the data of the second data type for the column from the affected row to a corresponding transition table column.

7. The method of claim 6, wherein the data of the second type in the affected row inserted in the corresponding transition table column is capable of not being referenced by the triggered action.

8. The method of claim 1, further comprising:
generating a data structure indicating columns in the transition table having data of the data type referenced y the triggered action, wherein the reference is only stored in those transition table columns referenced by the triggered action.

9. The method of claim 8, wherein the reference is not generated and inserted in the transition table columns having data of the data type that are not indicated in the data structure as including data referenced by the triggered action.

10. The method of claim 1, wherein the data type for which the reference is generated comprise a large object data type.

11. The method of claim 1, wherein the reference is generated based on the base table, and wherein subsequent to generating the reference the generated reference is inserted into the transition table that is different from the base table.

12. The method of claim 11, wherein the reference inserted in the transition table is used to access an auxiliary table that is different from the base table and the transition table, wherein the data type for which the reference is generated comprises a large object data type, and wherein large object data corresponding to the large object data type is stored in the auxiliary table.

13. A system for implementing a database trigger, comprising:
a computer readable medium, including:
a database;
a base table within the database;
a transition table within the database;
a processor communication with the computer readable medium;
means for detecting a trigger event;
means for determining at least one row in the base table affected by the trigger event;
means for generating a reference referencing the data of the data type for each column in the base table of a data type that is referenced in a triggered action associated with the trigger event;
means for inserting the reference in the transition table column including data of the data type from the affected row in the base table referenced in the triggered action; and
means for using the reference to access the data of the data type when performing the triggered action.

14. The system of claim 13, wherein the reference includes a row identifier and version number of the data in the base table column referenced by the triggered action.

15. The system of claim 14, wherein the means for using the reference to access the data accesses the data having the version number indicated in the reference at the row identifier location of the data maintained for the base table.

16. The system of claim 15, further comprising:
means for placing a lock on the data having the version number included in the reference referenced by the triggered action.

17. The system of claim 14, wherein the data type for which the reference is generated comprise a large object data type, wherein the means for using the reference to access the large object data further performs:
accessing a auxiliary table storing large object data for the base table column referenced by the triggered action; and
using the row identifier and the version number in the reference to access the large object in the auxiliary table, wherein the row identifier and version number identify the location of the large object data in the auxiliary table.

18. The system of claim 13, wherein the data type in the base table column for which the reference is generated comprises a first data type and wherein at least one base table column has data of second data type, further comprising:
for each column in the base table including data of the second data type, inserting the data of the second data the for the column from the affected row to a corresponding transition table column.

19. The system of claim 18, wherein the data of the second type in the affected row inserted in the corresponding transition table column is capable of not being referenced by the triggered action.

20. The system of claim 13, further comprising:
means for generating a data structure in the computer readable medium indicating columns in the transition table having data of the data type referenced by the triggered action, wherein the reference is only stored in those transition table columns referenced by the triggered action.

21. The system of claim 20, wherein the reference is not generated and inserted in the transition table columns having data of the data type that are not indicated in the data structure as including data referenced by the triggered action.

22. The system of claim 13, wherein the data type for which the reference is generated comprise a large object data type.

23. The system of claim 13, wherein the reference is generated based on the base table, and wherein subsequent to generating the reference the generated reference is inserted into the transition table that is different from the base table.

24. The system of claim 23, wherein the computer readable medium further comprises an auxiliary table within the database, wherein the reference inserted in the transition table is used to access the auxiliary table that is different from the base table and the transition table, wherein the data type for which the reference is generated comprises a large object data type, and wherein large object data corresponding to the large object data type is stored in the auxiliary table.

25. A program for implementing a database trigger, wherein the program includes code implemented in a computer readable medium capable of causing a processor to perform:

detecting a trigger event;

determining at least one row in a base table affected by the trigger event;

for each column in the base table of a data type that is referenced in a triggered action associated with the rigger event, generating a reference referencing the data of the data type;

inserting the reference in a transition table column including data of the data type from the affected row in the base table referenced in the triggered action; and using the reference to access the data of the data type when performing the triggered action.

26. The program of claim 25, wherein the reference includes a row identifier and version number of the data in the base table column referenced by the triggered action.

27. The program of claim 26, wherein using the reference to access the data comprises accessing the data having the version number indicated in the reference at the row identifier location of the data maintained for the base table.

28. The program of claim 27, wherein the program code is further capable of causing the processor to perform:

placing a lock on the data having the version number included in the reference referenced by the triggered action.

29. The program of claim 26, wherein the data type for which the reference is generated comprises a large object data type, wherein using the reference to access the large object data comprises:

accessing an auxiliary table storing large object data for the base table column referenced by the triggered action; and using the row identifier and the version number in the reference to access the large object in the auxiliary table, wherein the row identifier and version number identify the location of the large object data in the auxiliary table.

30. The program of claim 25, wherein the data type in the base table column for which the reference is generated comprises a first data type and wherein at least one base table column has data of a second data type, and wherein the program code is further capable of causing the processor to perform:

for each column in the base table including data of the second data type, inserting the data of the second data type for the column from the affected row to a corresponding transition table column.

31. The program of claim 30, wherein the data of the second type in the affected row insert in the corresponding transition table column is capable of not being referenced by the triggered action.

32. The program of claim 25, wherein the program code is further capable of causing the processor to perform:

generating a data structure indicating columns in the transition table having data of the data type reference by the triggered action, wherein the reference is only stored in those transition table columns referenced by the triggered action.

33. The program of claim 32, wherein the reference is not generated and inserted in the transition table columns having data of the data type that are not indicated in the data structure as including data referenced by the triggered action.

34. The program of claim 25, wherein the data type for which the reference is generated comprise a large object data type.

35. The program of claim 25, wherein the reference is generated based on the base table, and wherein subsequent to generating the reference the generated reference is inserted into the transition table that is different from the base table.

36. The program of claim 35, wherein the reference inserted in the transition table is used to access an auxiliary table that is different from the base table and the transition table, wherein the data type for which the reference is generated comprises a large object data type, and wherein large object data corresponding to the large object data type is stored in the auxiliary table.

* * * * *

UNITED STATES PATENT AND TRADEMARK OFFICE
CERTIFICATE OF CORRECTION

PATENT NO. : 6,829,616 B2 Page 1 of 1
APPLICATION NO. : 09/817501
DATED : December 7, 2004
INVENTOR(S) : Yao-Ching Stephen Chen et al.

It is certified that error appears in the above-identified patent and that said Letters Patent is hereby corrected as shown below:

Column 6, line 54, delete "rigger" and insert -- trigger --.
Line 6, line 57, delete "a" and insert -- the --.

Column 7, line 33, delete "y the" and insert -- by the --.
Line 63, after "processor", insert -- in --.

Column 8, line 23, delete "comprise" and insert -- comprises --.
Line 27, delete "a auxiliary" and insert -- an auxiliary --.
Line 38, delete "of second", and insert -- of a second --.
Line 42, delete "the for" and insert -- type for --.

Column 9, line 18, delete "rigger" and insert -- trigger --.

Column 10, line 23, delete "reference" and insert -- referenced --.

Signed and Sealed this

Fourteenth Day of November, 2006

JON W. DUDAS
*Director of the United States Patent and Trademark Office*